United States Patent
Smith et al.

(10) Patent No.: US 12,184,131 B2
(45) Date of Patent: Dec. 31, 2024

(54) INTERLOCKING TOOL FOR FORMING STATOR WINDING END TURNS

(71) Applicant: GM Global Technology Operations LLC, Detroit, MI (US)

(72) Inventors: Mark A. Smith, Huntington Woods, MI (US); Ante Tony Lausic, Burlington (CA); John S. Agapiou, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 409 days.

(21) Appl. No.: 17/680,578

(22) Filed: Feb. 25, 2022

(65) Prior Publication Data

US 2023/0275494 A1    Aug. 31, 2023

(51) Int. Cl.
*H02K 15/00*    (2006.01)
*B21D 37/10*    (2006.01)

(52) U.S. Cl.
CPC ......... *H02K 15/0037* (2013.01); *B21D 37/10* (2013.01)

(58) Field of Classification Search
CPC . B21D 37/10; H02K 15/0037; H02K 15/0087
See application file for complete search history.

(56) References Cited

U.S. PATENT DOCUMENTS

| | | | |
|---|---|---|---|
| 10,396,639 B2 * | 8/2019 | Radtke | H02K 15/0087 |
| 2013/0276295 A1 | 10/2013 | Guercioni | |
| 2023/0275494 A1 * | 8/2023 | Smith | H02K 15/0087 |
| | | | 29/736 |

FOREIGN PATENT DOCUMENTS

| | | |
|---|---|---|
| CN | 211981469 U | 11/2020 |
| DE | 102018221562 A1 | 6/2020 |
| DE | 102019211713 A1 | 2/2021 |
| JP | 2021151136 A | 9/2021 |

OTHER PUBLICATIONS

German Application No. 10 2022 126 838.1 filed Oct. 14, 2022; German Office Action dated Oct. 11, 2023; 9 pages.
Lachmayer, R et al. (Ed.); "Additive Manufacturing Quantifiziert: Visionäre Anwendungen und Stand der Technik"; Springer Publishing, Berlin, 2017; ISBN 978-3-662-64113-5 (eBook) pp. 9-10.

* cited by examiner

*Primary Examiner* — Minh N Trinh
(74) *Attorney, Agent, or Firm* — CANTOR COLBURN LLP (57) ABSTRACT

An interlocking tool for a for forming stator end turns includes a first member including a first base having a first surface. A first ring extends from the first surface and a second ring extends from the first surface radially outwardly of the first ring. The second ring is spaced from the first ring by a first gap. A second member includes a second base having a first surface portion. A first ring element extends from the first surface portion and a second ring element extends from the first surface portion radially inwardly of the first ring element. The second ring element is spaced from the first ring element by a second gap. The second ring is positioned in the second gap, and the second ring element is positioned in the first gap. The first member is rotatable relative to the second member.

20 Claims, 7 Drawing Sheets

INTERLOCKING TOOL FOR FORMING STATOR WINDING END TURNS

INTRODUCTION

The subject disclosure relates to the art of electric machines and, more particularly to an interlocking tool for forming stator winding end turns for an electric machine.

Electric machines include a housing that supports a stator. A rotor, supported by a shaft, rotates within the stator. The rotor may support a magnetic field that induces current in the stator to produce electricity (generator) or energy passing through the stator may induce a magnetic field in the rotor (motor). The stator includes a core that supports windings. A first portion of the windings extends axially outwardly of a first end of the core forming a first stator end turn and a second portion of the windings extends axially outwardly of a second, opposing end of the core forming a second stator end turn. One of the first end turn and the second end turn includes terminal ends of the windings that are connected to establish a desired electrical connection for the stator.

Prior to making the electrical connection, the corresponding end turn is twisted and folded in order to reduce an overall axial length of the stator. A multi-component tool is employed to shape the end turn. The multi-component tool includes a series of coaxial rings each having different diameters. A first number of the rings are rotated in a first direction and a second number of the rings are rotated in a second, opposing, direction to shape the end turn. Each ring engages and shapes different layers of the windings.

The rings must be precisely positioned one to another in order to ensure a proper alignment of the terminal ends. Connecting the rings, aligning the rings, and mounting the rings to a shaping tool all take time and require special tooling and expertise that add to an overall cost of forming the stator. Accordingly, the industry would welcome a less labor intensive system for shaping end turns.

SUMMARY

In accordance with a non-limiting example, an interlocking tool for forming stator end turns includes a first member including a first base having a first surface and an opposing second surface. A first ring extends from the first surface and a second ring extends from the first surface radially outwardly of the first ring. The second ring is spaced from the first ring by a first gap. A second member includes a second base having a first surface portion and an opposing second surface portion. A first ring element extends from the first surface portion and a second ring element extends from the first surface portion radially inwardly of the first ring element. The second ring element is spaced from the first ring element by a second gap. The second ring is positioned in the second gap, and the second ring element is positioned in the first gap. The first member is rotatable relative to the second member.

In addition to one or more of the features described above or below, or as an alternative, further embodiments could include wherein the second base includes an opening that circumscribes the first base.

In addition to one or more of the features described above or below, or as an alternative, further embodiments could include wherein the first member includes a first mounting element extending outwardly of the second surface and the second member includes a second mounting element extending outwardly of the second surface portion.

In addition to one or more of the features described above or below, or as an alternative, further embodiments could include wherein the first ring includes a first annular surface and a first outer edge, the first annular surface being connected to the base portion through a ring support.

In addition to one or more of the features described above or below, or as an alternative, further embodiments could include wherein the second ring includes a second annular surface and a second outer edge, the second annular surface including a first window aligned with the ring support.

In addition to one or more of the features described above or below, or as an alternative, further embodiments could include wherein the ring support extends at an angle from the first base to form the first gap.

In addition to one or more of the features described above or below, or as an alternative, further embodiments could include wherein the first ring includes an inner edge is spaced from the second base.

In addition to one or more of the features described above or below, or as an alternative, further embodiments could include wherein the first ring element includes a first annular surface portion, a first outer edge portion, and a first inner edge portion that is spaced from the second base, the inner edge portion defining a second window.

In addition to one or more of the features described above or below, or as an alternative, further embodiments could include wherein the second ring element includes a second annular surface portion and a second outer edge portion, the second annular surface portion being connected to the base portion through a ring support element arranged at the second window.

In addition to one or more of the features described above or below, or as an alternative, further embodiments could include wherein the ring support element extends at an angle from the second base to form the second gap.

In addition to one or more of the features described above or below, or as an alternative, further embodiments could include wherein the first window defines a first travel limiter establishing an amount to rotation of the second member relative to the first member.

In addition to one or more of the features described above or below, or as an alternative, further embodiments could include wherein the amount of rotation is about.

In addition to one or more of the features described above or below, or as an alternative, further embodiments could include wherein the ring supports a first plurality of comb fingers and the second ring supports a second plurality of comb fingers.

In addition to one or more of the features described above or below, or as an alternative, further embodiments could include wherein the first ring element supports a first plurality of comb finger elements and the second ring element supports a second plurality of comb finger elements.

In addition to one or more of the features described above or below, or as an alternative, further embodiments could include wherein the first member and the second member are additively manufactured to form the interlocking tool.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
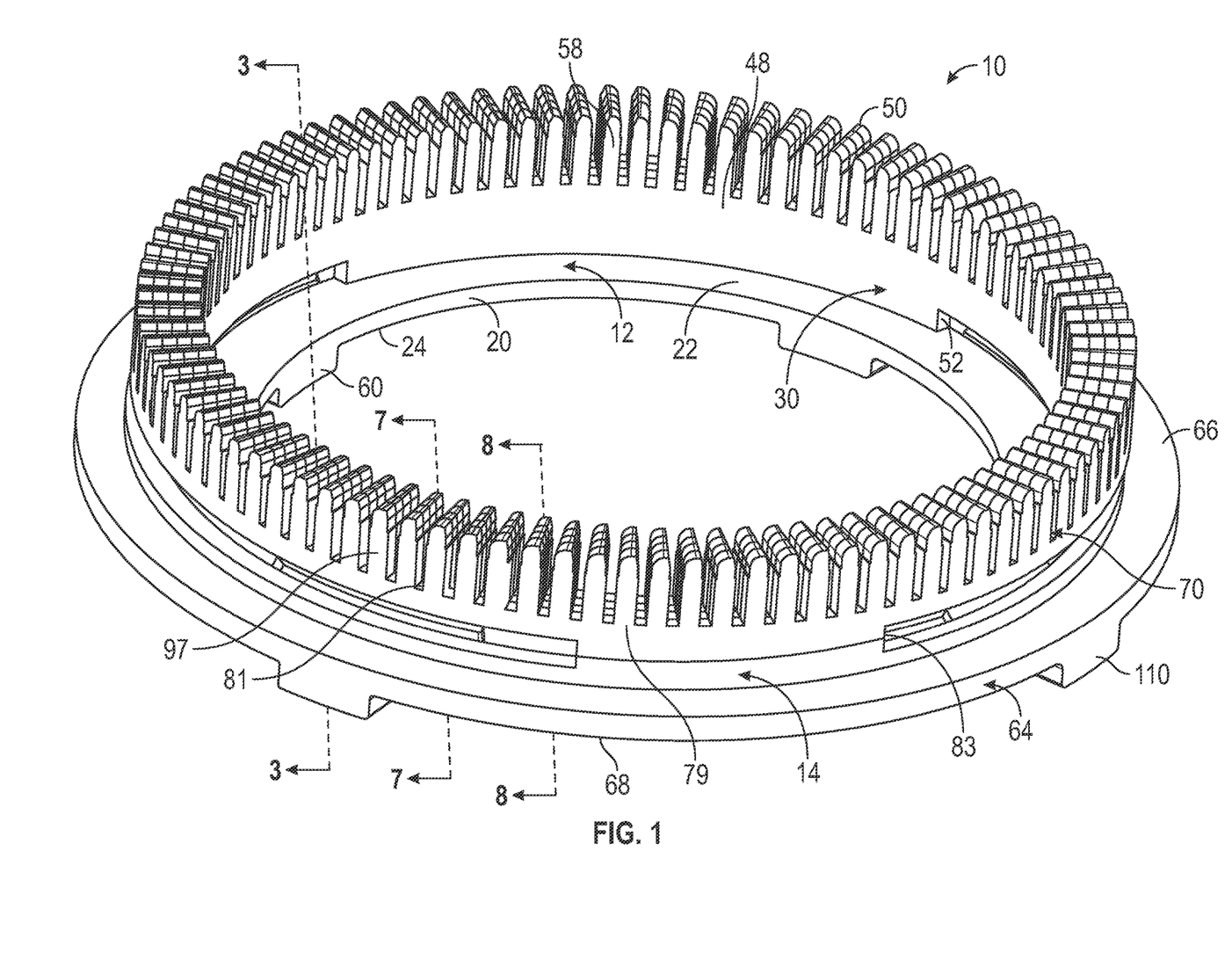
FIG. 1 is a perspective view of an interlocking tool for shaping a stator end turn, in accordance with a non-limiting example.

An interlocking tool, in accordance with a non-limiting example, is indicated generally at 10 in FIG. 1. Interlocking tool 10 includes a first member 12 that is nested and interlocked with a second member 14. First member 12 may rotate relative to second member 14 and second member 14 may rotate relative to first member 12. In a non-limiting example, first member 12 and second member 14 in addition to being nested together, are also interlocked one with another. The interlocking is achieved through an additive manufacturing process that constructs first member 12 and second member 14 substantially simultaneously. Thus, while being rotatable relative to one another, first member 12 and second member 14 are interlocked. That is, first member 12 cannot be readily separated from second member 14 in accordance with a non-limiting example. In a non-limiting example, first member 12 and second member 14 are formed from metal and/or metal alloys. In other non-limiting examples, first member 12 and second member 14 may be formed from various forms of plastics, ceramics, composites, and the like.

Figure 2:
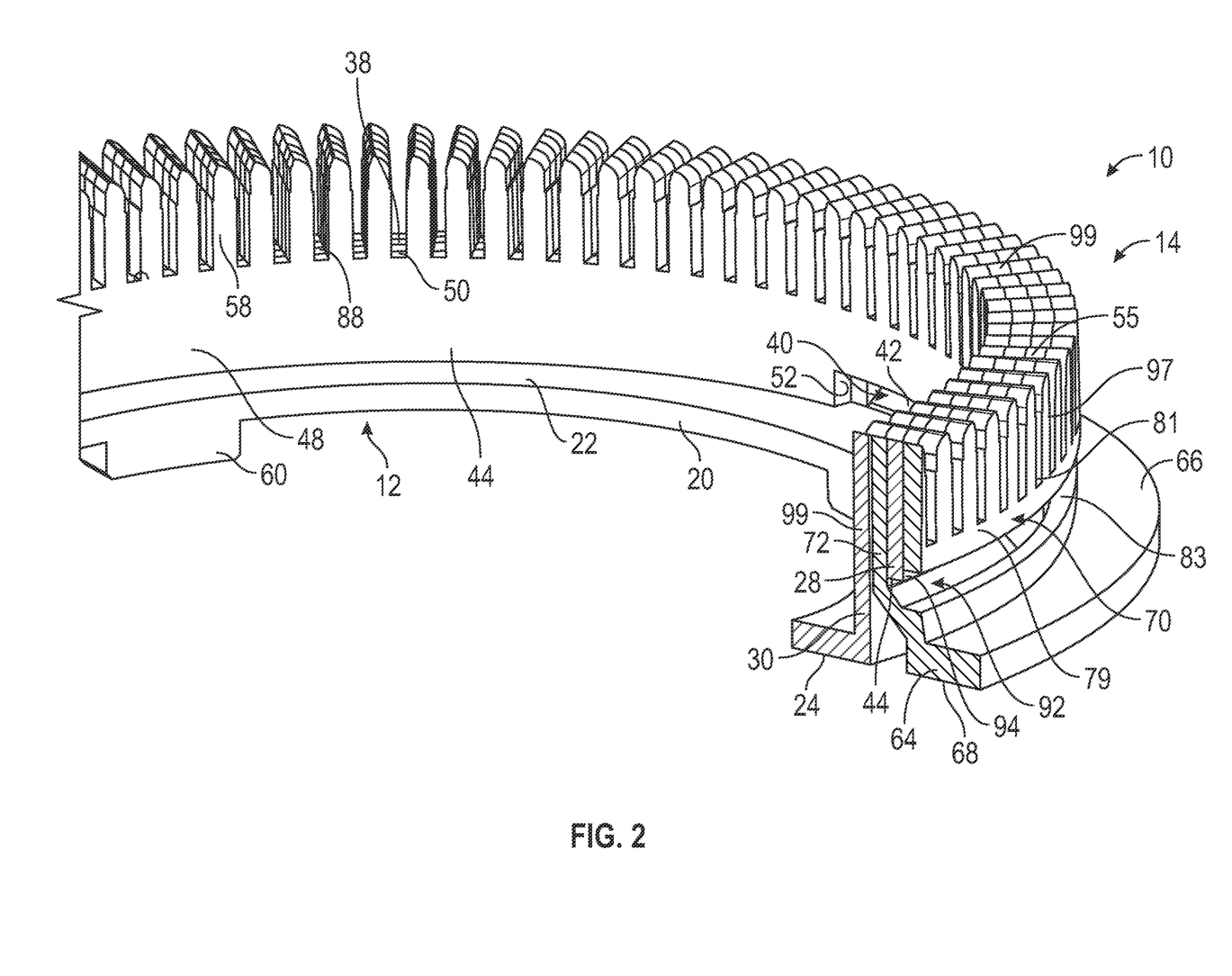
FIG. 2 is a cross-sectional perspective view of the interlocking tool of FIG. 1, in accordance with a non-limiting example.
Figure 3:
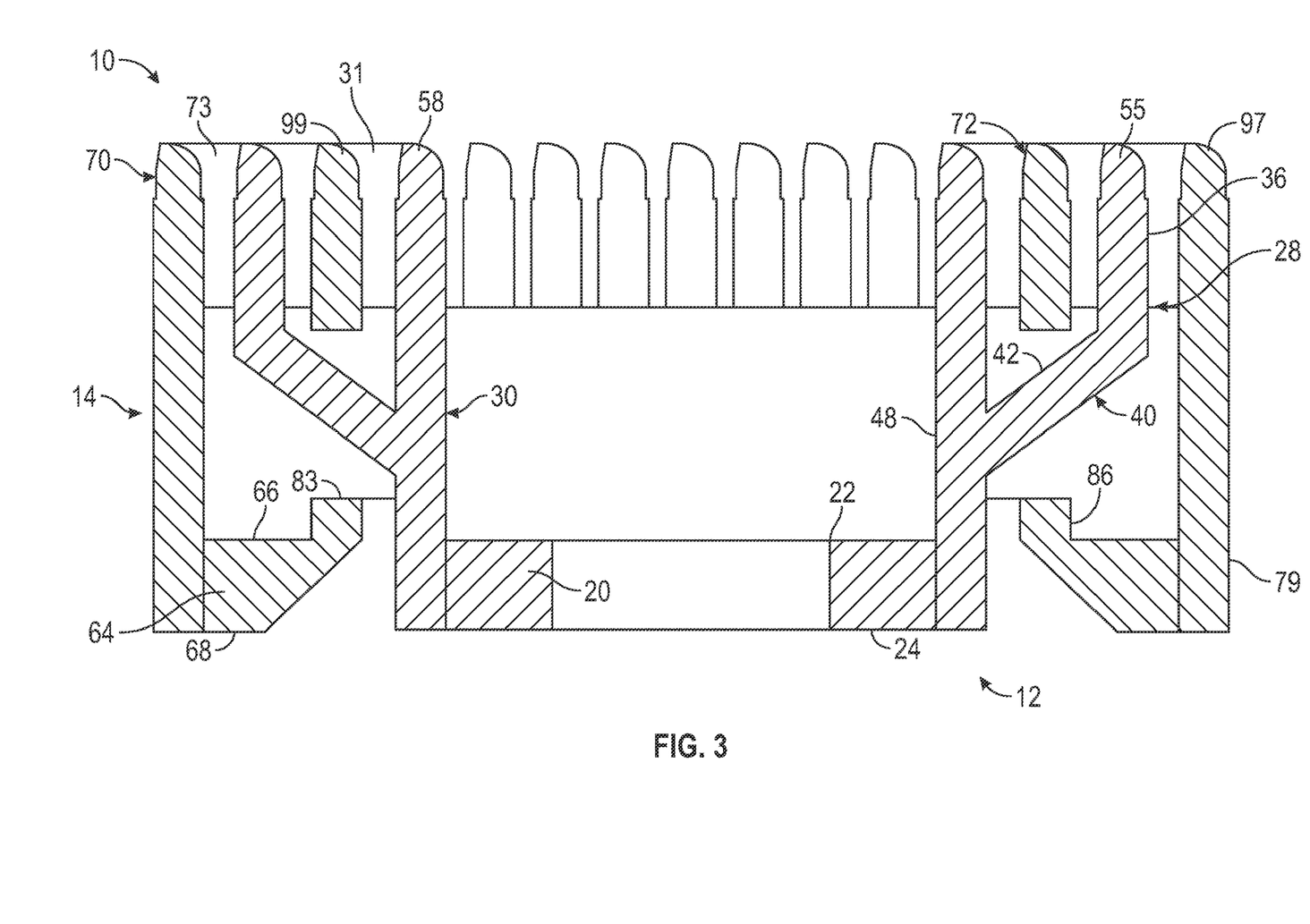
FIG. 3 is a cross-sectional plan view of the interlocking tool of FIG. 1 taken through the line 3-3, in accordance with a non-limiting example.
Figure 4:
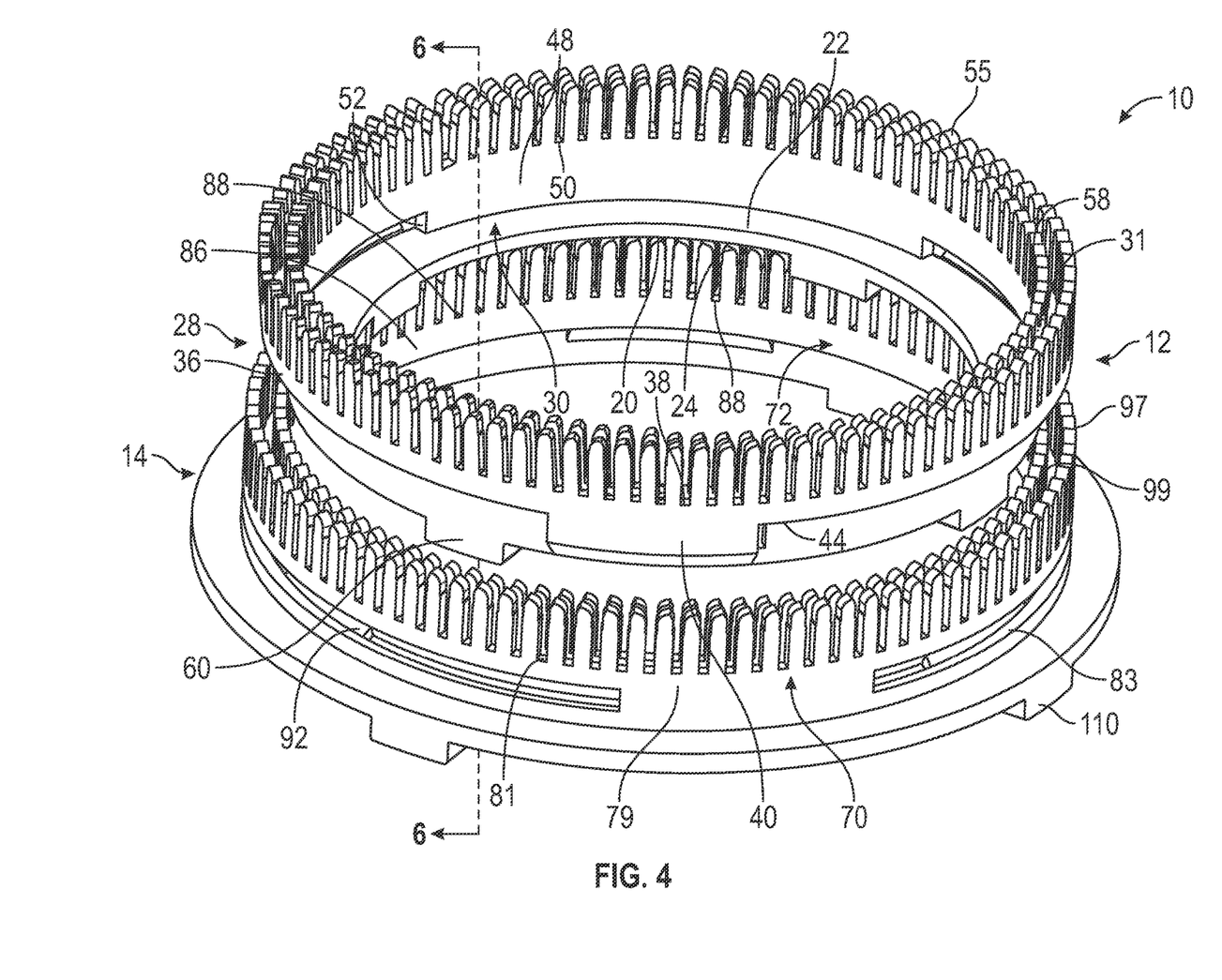
FIG. 4 is a disassembled view of the interlocking tool of FIG. 1, in accordance with a non-limiting example.

In accordance with a non-limiting example, first member 12 includes a first base 20 having a first surface 22 and a second surface 24. Second surface 24 is opposite to first surface 22. First member 12 includes a first ring 28 (FIG. 2) and a second ring 30. Second ring 30 is arranged radially inwardly of, and spaced from, first ring 28 by a first gap 31 (FIG. 3).

Referring to FIGS. 2-8 and with continued reference to FIG. 1, first ring 28 includes a first annular surface 36 having a first outer edge 38. First ring 28 is coupled to first base 20 through a ring support 40. Ring support 40 includes an angled portion 42 that creates first gap 31. In a non-limiting example, first ring 28 includes an inner edge 44 (FIG. 2) that is spaced from first base 20. At this point, it should be understood that the number and spacing of ring support(s) 40 may vary.

In accordance with a non-limiting example, second ring 30 includes a second annular surface 48 that extends from first base 20 and includes a second outer edge 50. Second annular surface 48 includes a first window 52 arranged at ring support 40. In a non-limiting example, the number and spacing of first window(s) 52 may vary. First ring 28 supports a first plurality of comb fingers 55 and second ring 30 supports a second plurality of comb fingers 58. First plurality of comb fingers 55 and second plurality of comb fingers 58 are arranged to shape two non-adjacent layers of a stator end turn as will be discussed more fully herein. That is, first member 12 is supported at a first rotating machine (not shown) through a first mounting element 60 that extends from second surface 24. First member 12 is rotated in a first direction relative to second member 14 as will be detailed herein.

In accordance with a non-limiting example, second member 14 includes a second base 64 having a first surface portion 66 and a second surface portion 68. In some embodiments, a second mounting element 110 extends from the second surface portion 68. Second surface portion 68 is opposite first surface portion 66. Second member 14 includes a first ring element 70 and a second ring element 72. Second ring element 72 is arranged radially inwardly of, and spaced from, first ring element 70 by a second gap 73. In a non-limiting example, first ring 28 is disposed within second gap 73 and second ring element 72 is arranged in first gap 31. With this arrangement, first member 12 and second member 14 are interlocked with one another. As discussed herein, it should be understood that while described as being interlocked, first member 12 and second member 14 may move relative to one another as will be detailed herein.

Figure 9:
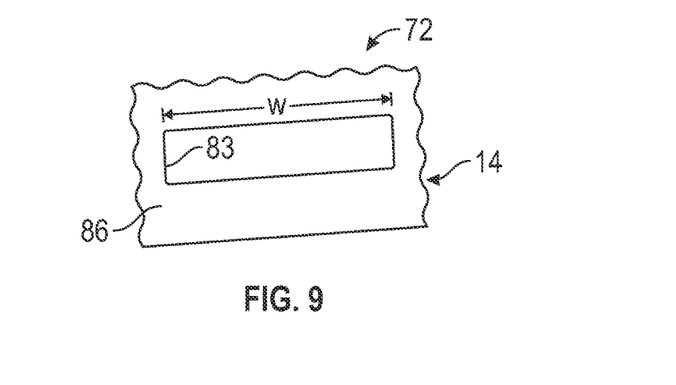
FIG. 9 is a plan view of a window formed in the interlocking tool of FIG. 1, in accordance with a non-limiting example.

In a non-limiting example, first ring element 70 includes a first annular surface portion 79 that extends from first surface portion 66. First annular surface portion 79 includes a first outer edge portion 81 and a second window 83. As will be detailed more fully herein, ring support 40 extends through second window 83 so as to support first ring 28 in second gap 73 (FIG. 3). In this manner, second window acts as a travel limiter. That is, when second member 14 rotates relative to first member 12, an amount of travel is determined by a circumferential width "w" of second window 83 (FIG. 9). A similar constraint is imposed on first member 12. In a non-limiting example, second window 83 may allow 30° of rotation of first member 12 relative to second member 14 and 30° of rotation of second member 14 relative to first member 12 thereby allowing a combined relative rotation of 60°.

Figure 5:
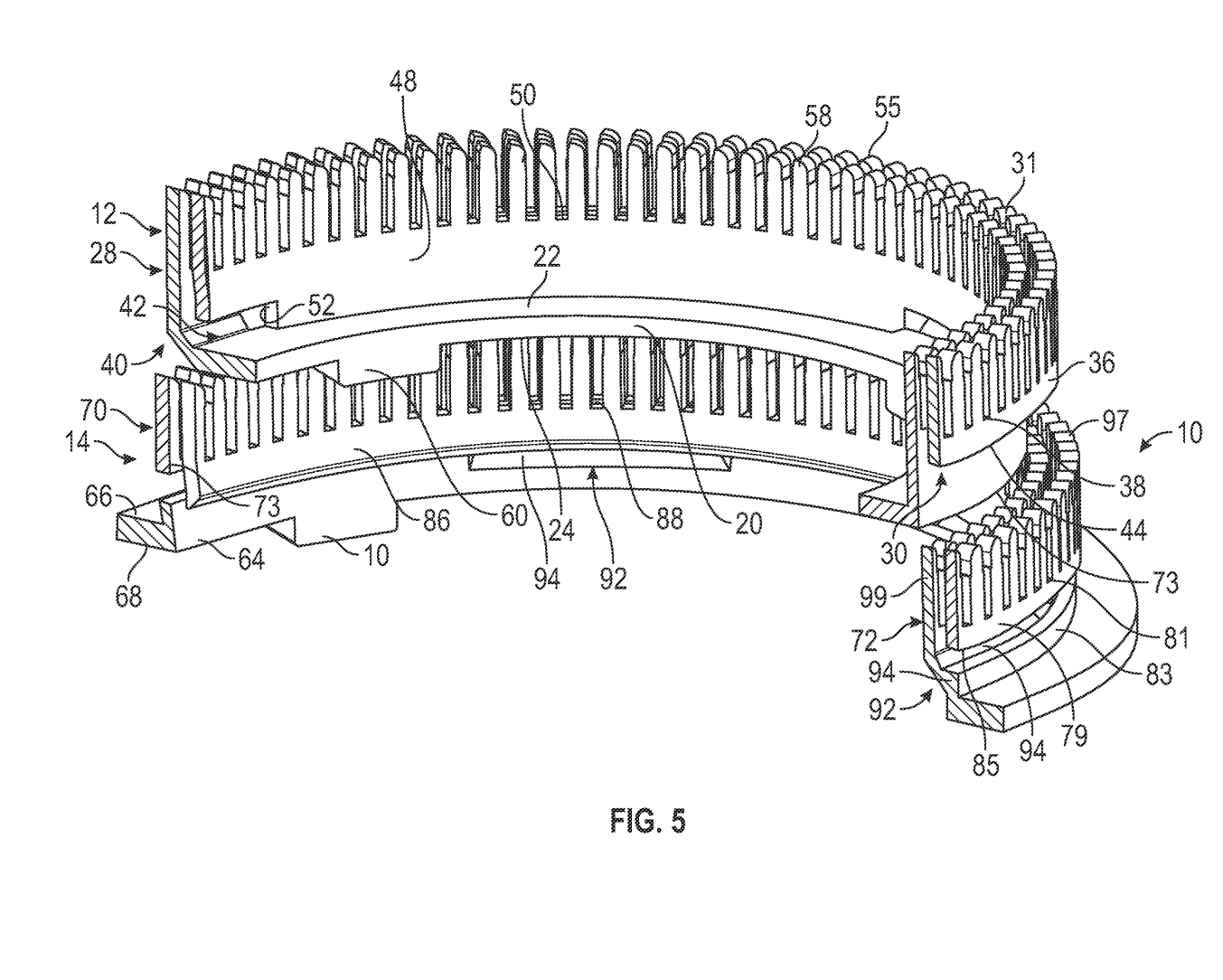
FIG. 5 is a cross-sectional perspective view of the interlocking tool of FIG. 4, in accordance with a non-limiting example.
Figure 6:
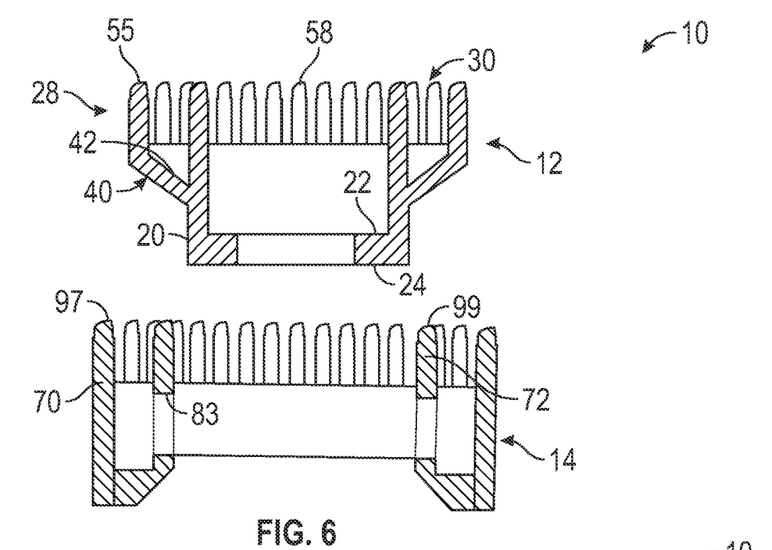
FIG. 6 is a cross-sectional plan view of the interlocking tool of FIG. 4 taken through the line 6-6, in accordance with a non-limiting example.
Figure 7:
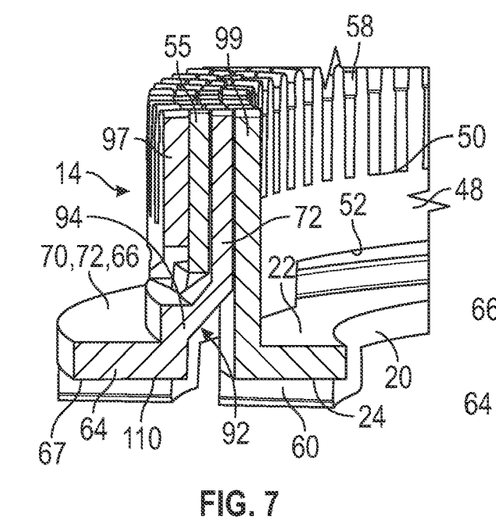
FIG. 7 is a cross-sectional view of the interlocking tool of FIG. 1 taken through the line 7-7, in accordance with a non-limiting example.
Figure 8:
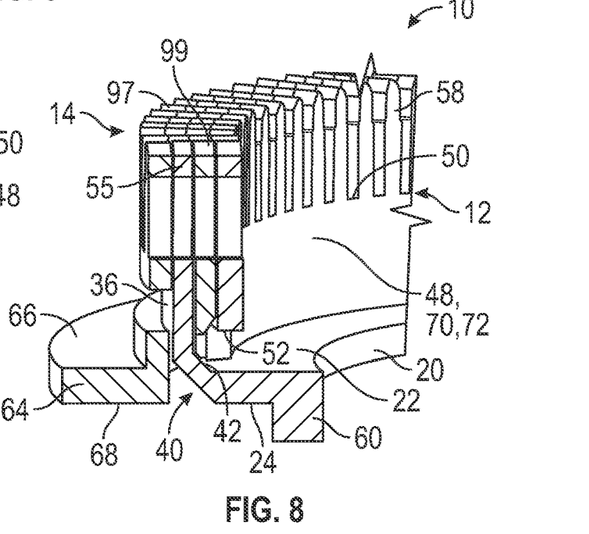
FIG. 8 is a cross-sectional view of the interlocking tool of FIG. 1 taken along the line 8-8, in accordance with a nonlimiting example.

In a non-limiting example, second ring element 72 includes a second annular surface portion 86, FIG. 5, that extends from first surface portion 66. Second annular surface portion 86 includes a second outer edge portion 88. A ring support element 92 connects second ring element 72 to first surface portion 66. Ring support element 92 includes an angled surface section 94 that establishes second gap 73. In a non-limiting example, first ring element 70 includes a first plurality of comb finger elements 97 that extend from first outer edge portion 81 and second ring element 72 includes a second plurality of comb finger elements 99 that extend from second outer edge portion 88. First plurality of comb finger elements 97 and second plurality of comb finger elements 99 are arranged to shape two additional non-adjacent layers of a stator end turn as will be discussed more fully herein.

Figure 10:
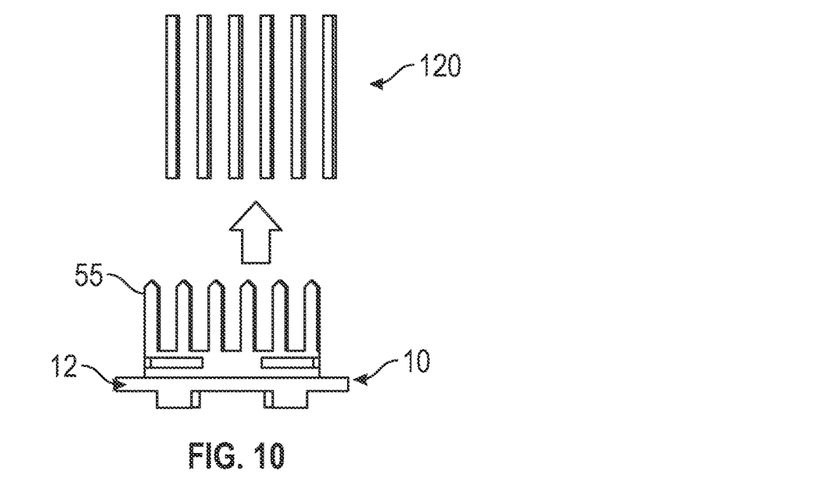
FIG. 10 is a schematic view of the interlocking tool being brought into engagement with terminal ends of a stator end turn, in accordance with a non-limiting example.
Figure 11:
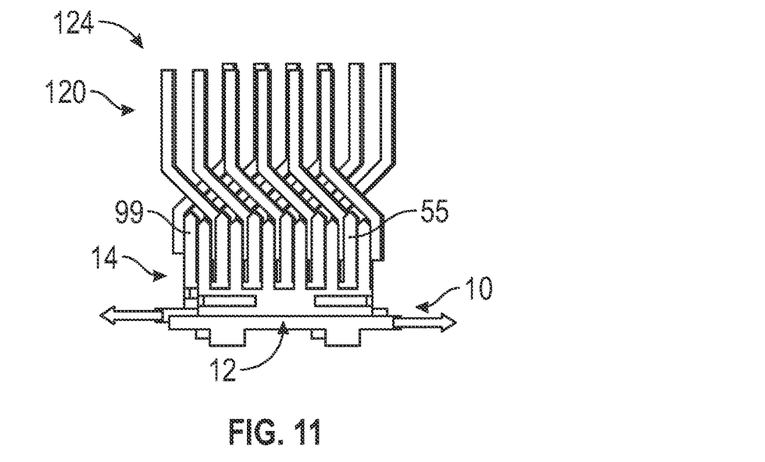
FIG. 11 is a schematic view of the interlocking tool of FIG. 10 shaping the terminal ends of the stator end turn, in accordance with a non-limiting example.

In a non-limiting example, the first and second plurality of comb fingers 55 and 58 are aligned relative to one another as well as to first and second pluralities of comb finger elements 97 and 99 as shown in FIG. 3. As shown in FIG. 10, in this configuration, interlocking tool 10 is brought into engagement with terminal ends 120 of a stator end turn. Once terminal ends 120 interact with first and second plurality of comb fingers 55 and 58 and first and second pluralities of comb finger elements 97 and 99, first and second members 12 and 14 are rotated one relative to another to bend and shape terminal ends 120 as shown in FIG. 11. In a non-limiting example, interlocking tool 10 shapes the four radially outermost layers of terminal ends 120. The amount of bend is determined by, for example, the amount of rotation provided by the width of second window 83.

Figure 12:
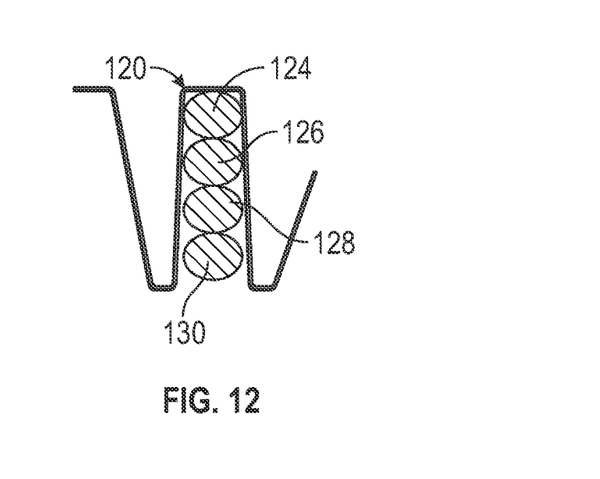
FIG. 12 is a partial cross-sectional axial end view of a stator end turn.

That is, in a non-limiting example, terminal end 120 includes four layers as shown in FIG. 12, a first or radially outermost later 124, a second layer 126 arranged radially inwardly of first layer 124, a third layer 128 arranged radially inwardly of second layer 126, and a fourth layer 130 arranged radially inwardly of third layer 128. It should be understood that the number of layers may vary. In a non-limiting example, first plurality of comb finger elements 97 of second member 14 engage with and act upon terminal ends 120 in first layer 124. Second plurality of comb finger elements 99 of second member 14 engage and act upon terminal ends 120 in third layer 128. First plurality of comb fingers 55 of first member 12 engage with and act upon terminal ends 120 in second layer 126 and second plurality of comb fingers 58 engage with and act upon terminal ends 120 in fourth layer 130.

The non-limiting examples discussed herein describe a multi-component interlocking tool for shaping stator end turns. By forming two members each having two spaced rings, there is no need to separately join and align multiple components while, at the same time, ensuring relative rotation between tool components. The interlocking construction allows for easy alignment and maintenance of clearances, avoids the need for shims, mechanical fasteners and expertise needed to put together a tool for shaping end turns. Further, it should be understood that the number of members and the number of rings per member may vary depending upon end turn configuration and electrical connection scheme.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An interlocking tool for forming stator end turns comprising:
    a first member including a first base having a first surface and an opposing second surface, a first ring extends from the first surface and a second ring extends from the first surface radially outwardly of the first ring, the second ring being spaced from the first ring by a first gap; and
    a second member including a second base having a first surface portion and an opposing second surface portion, a first ring element extends from the first surface portion and a second ring element extends from the first surface portion radially inwardly of the first ring element, the second ring element being spaced from the first ring element by a second gap,
    wherein the second ring is positioned in the second gap, and the second ring element is positioned in the first gap, the first member being rotatable relative to the second member.

2. The interlocking tool according to claim 1, wherein the second base includes an opening that circumscribes the first base.

3. The interlocking tool according to claim 1, wherein the first member includes a first mounting element extending outwardly of the second surface and the second member includes a second mounting element extending outwardly of the second surface portion.

4. The interlocking tool according to claim 1, wherein the first ring includes a first annular surface and a first outer edge, the first annular surface being connected to the first base through a ring support.

5. The interlocking tool according to claim 4, wherein the second ring includes a second annular surface and a second outer edge, the second annular surface including a first window aligned with the ring support.

6. The interlocking tool according to claim 5, wherein the ring support extends at an angle from the first base to form the first gap.

7. The interlocking tool according to claim 5, wherein the first ring includes an inner edge is spaced from the second base.

8. The interlocking tool according to claim 5, wherein the first ring element includes a first annular surface portion, a first outer edge portion, and a first inner edge portion that is spaced from the second base, the first inner edge portion defining a second window.

9. The interlocking tool according to claim 8, wherein the second ring element includes a second annular surface portion and a second outer edge portion, the second annular surface portion being connected to the first base through a ring support element arranged at the second window.

10. The interlocking tool according to claim 9, wherein the ring support element extends at an angle from the second base to form the second gap.

11. The interlocking tool according to claim 10, wherein the first window defines a first travel limiter establishing an angle of rotation of the second member relative to the first member.

12. The interlocking tool according to claim 11, wherein the angle of rotation of the second member is defined by a width of the first window.

13. The interlocking tool according to claim 12, wherein the angle of rotation of the second member relative to the first member is about 30°.

14. The interlocking tool according to claim 12, wherein the angle of rotation of the first member relative to the second member is about 30°.

15. The interlocking tool according to claim 1, wherein the first ring supports a first plurality of comb fingers and the second ring supports a second plurality of comb fingers.

16. The interlocking tool according to claim 15, wherein the first ring element supports a first plurality of comb finger elements and the second ring element supports a second plurality of comb finger elements.

17. The interlocking tool according to claim 1, wherein the first member and the second member are coupled together to form the interlocking tool.

18. The interlocking tool according to claim 1, wherein one of the first member and the second member is one of a metal and a metal composite.

19. The interlocking tool according to claim 18, wherein each of the first member and the second member is one of a metal and a metal composite.

20. The interlocking tool according to claim 1, wherein one of the first member and the second member is a non-metal.

* * * * *